United States Patent [19]
Klepacki

[11] Patent Number: 4,761,993
[45] Date of Patent: Aug. 9, 1988

[54] METHOD FOR MONITORING THE OPERATION OF AN INTERNAL COMBUSTION ENGINE

[75] Inventor: Wojciech Klepacki, Courbevoie La Defense, France

[73] Assignee: Societe D'Etudes De Machines Thermiques, Saint Denis, France

[21] Appl. No.: 30,016

[22] Filed: Mar. 25, 1987

[30] Foreign Application Priority Data

Mar. 28, 1986 [FR] France .............................. 8604517
May 14, 1986 [FR] France .............................. 8606934

[51] Int. Cl.$^4$ .......................................... G01M 15/00
[52] U.S. Cl. ......................................... 73/115; 73/660
[58] Field of Search ............... 73/115, 660, 35, 117.3

[56] References Cited

U.S. PATENT DOCUMENTS

3,495,451  2/1970  Verhoef ............................ 73/117.3
4,424,709  1/1984  Meier, Jr. et al. ................ 73/115 X

FOREIGN PATENT DOCUMENTS

59-109831  6/1984  Japan.

Primary Examiner—Jerry W. Myracle
Attorney, Agent, or Firm—Kenyon & Kenyon

[57] ABSTRACT

The pressure change in the combustion chamber of a sample engine is correlated with the amplitude and frequency of the vibrations of various engine components, an equivalent level representative of the level of stresses or load on the components is computed and said equivalent level is used with respect to same-type engines, especially high-powered Diesel engines, in actual service, to make immediate decisions about modifying driving parameters or longer-effect decisions concerning preventive or remedial maintenance.

10 Claims, 1 Drawing Sheet

METHOD FOR MONITORING THE OPERATION OF AN INTERNAL COMBUSTION ENGINE

BACKGROUND OF THE INVENTION

This invention concerns a method for monitoring the operation of an internal combustion engine while it is in service.

Experience teaches that all the mechanical and thermal phenomena occurring in an internal combustion engine generate vibrations and this fact has been exploited in methods for detecting pinking or knocking. Such procedures in particular require that background noise which might mask an abnormal vibration be controlled or even eliminated by suitable processing of the signal. This is described in French patent FR No. 2 504 592. The main purpose of such methods is to detect the event on a pass/fail basis in view of undertaking the most immediate possible action to cancel it. These methods are generally implemented for engines whose load variations are frequent and rapid and they do not provide any statistical intelligence concerning engine life.

SUMMARY OF THE INVENTION

The present invention is directed to monitoring over a long period the level of stress withstood by the engine components surrounding the combustion chamber of an engine the load variations whereof are slow and/or infrequent, to the end of making immediate decisions about modifying the driving parameters or decisions about preventive or remedial action.

The inventive method for monitoring the operation of an internal combustion engine while in service includes the following steps:

record the change of pressure occurring in the combustion chamber(s) of one or more same-type sample or "control" engines for various values of the operating parameters, said parameters being temporarily modified as required to bring about a plurality of stabilized load conditions ranging from 0 to 100% and to cause vibrations of the amplitude of the pressure swings about the mean value of the pressure ranging from the minimum value of the amplitudes to a maximum value equal to ten times the minimum value, the recording being made over a range of frequencies from 0 to 30,000 Hz and covering one or more successive or nonsuccessive engine cycles;

simultaneously record at various points of the components surrounding the combustion chamber or chambers of the control engine or engines the amplitude and the frequency of the vibrations generated by overall operation in a frequency range of 0 to 30,000 Hz;

compute the ratio of the spectral power of the pressure signal to the spectral power of each of the signals supplied from each of the measuring points, or the ratio of any values representative of said powers;

determine for which measuring point this ratio differs least from a constant irrespective of load level, said measuring point being assumed to deliver a representative signal;

install on the service engine a vibration measuring device at the location deduced from the previous steps involving the control engines and use the spectral power level of the signal emitted at various periods during normal-duty operation of the engine, or a value representative of this power, to determine the behaviour of the components surrounding the combustion chamber and/or the severity of the stresses to which they are subjected and to take suitable remedial action.

Use of the spectral power leads to two alternative procedures from this point on.

According to the first alternative procedure, the spectral power of the representative signal is computed at different moments of service engine operation, at regular or irregular intervals and over the timespan of at least one complete cycle.

According to the second alternative procedure, the spectral power of the representative signal is computed at different moments of the operation of the service engine, at regular or irregular intervals and over one or more engine cycles. Data from only one or some parts of each cycle is saved.

There are several alternative ways of exploiting a representative value of the spectral power.

For example, according to one alternative, one can calculate the level of the constant and stable signal reproducing the same spectral power as the representative signal, said level constituting an equivalent level of stresses or of detection of the specific behaviour of one or several components surrounding the combustion chamber.

As another alternative, one can take as the representative value the vibratory energy of the signal obtained by the measuring system at different moments of the service engine's operation.

Preferably, based upon the vibration energy of the signal obtained by the measuring system, one computes the equivalent level of a constant, stable signal which represents the same vibration energy as the fluctuating vibrations actually occurring in the engine, said equivalent level being computed at different moments of service motor operation, at regular or irregular intervals and for one or more engine cycles, only one or some parts of which are saved.

Advantageously, the measurement periods are determined such as to cover one or more successive or non-successive cycles, each period being contained in a phase of service engine operation when the load varies little or not at all.

To obtain a history, the values of the sampled equivalent levels are classified by level and are stored by level category.

Lastly, the value of the different levels and/or the number of levels reached in the different categories is compared with set point values determined by experiment with the given type of service engine. The result of this comparison is used to decide about whether or not to modify one or more set point parameters and/or triggering preventive maintenance action.

DETAILED DESCRIPTION OF THE PREFERRED EMBODIMENT

A preferred embodiment of the inventive method will now be described by way of example.

Figure 1:
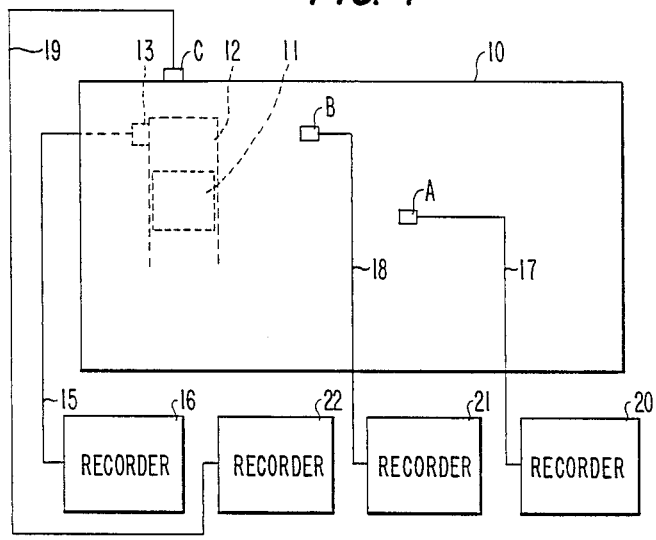
FIG. 1 is a schematic diagram of instrumentation for a test engine.

In FIG. 1 a test engine 10 has a piston 11 reciprocally disposed in a cylinder 12. A pressure sensor 13 installed in a combustion chamber 14 of the cylinder delivers a signal representing the change of pressure occurring in the combustion chamber via a line 15 to a recorder 16. Vibration sensors A, B, and C installed at various points of the components surrounding the combustion chamber deliver signals representing the amplitude and frequency of the vibrations generated by engine operation via lines 17, 18, and 19 to recorders 20, 21, and 22, respectively.

The test engine is operated at a plurality of successive stabilized load conditions ranging from 0 to 100% to cause variations of the amplitude of the pressure swings about the mean value of the pressure ranging from the minimum value of the amplitudes to a maximum value equal to ten times the minimum value. At each stabilized load condition, all of the recorders simultaneously make a record of their respective incoming signals over a range of frequencies from 0 to 30 kHz and covering at least one engine cycle.

Figure 2:
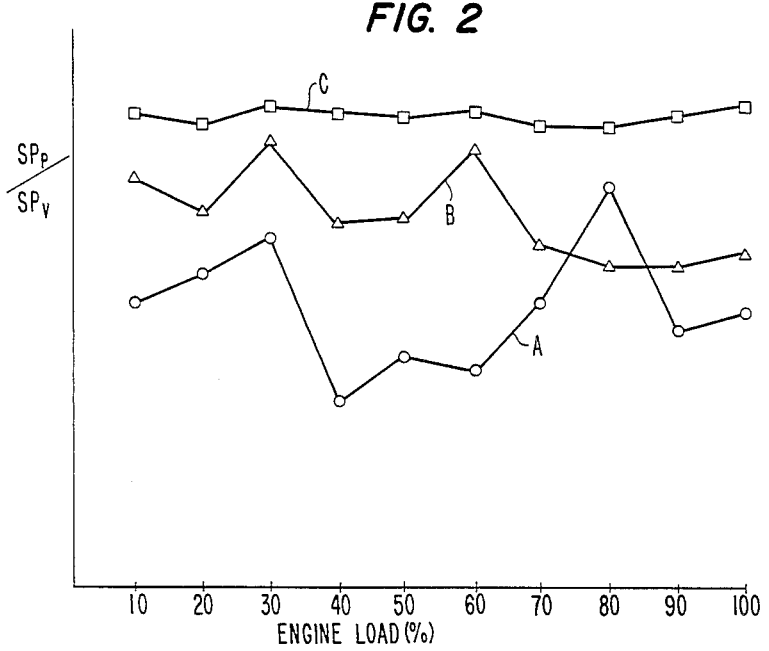
FIG. 2 is a hypothetical graph of the ratio of the spectral power of the pressure signal to the spectral power of each of the signals supplied from each of the measuring points of FIG. 1.

From each recording at each load setting a value representing the corresponding spectral power is determined by conventional techniques, and the ratio of the value representing spectral power of the pressure signal $SP_p$ to the value representing the spectral power of each of the vibration signals $SP_v$ from each of the measuring points is computed. FIG. 2 presents a hypothetical graph of these ratios plotted as a function of engine load in percent. According to this graph, it is determined that the ratios for measuring point C differ least from a constant, irrespective of load level. This measuring point is thus selected as delivering a vibration signal representative of the pressure variations in the combustion chamber.

A signal from a vibration sensor installed at this measuring point on a service engine can be processed to provide values representing spectral power level at various periods during normal-duty operation of the service engine. If this value exceeds the corresponding values determined from the vibration sensor at the same measuring point of the test engine, the behavior of the components surrounding the combustion chamber and the severity of the stresses to which they are subjected should be investigated and appropriate remedial action taken.

Numerous factors can influence the level of stress to which the components surrounding the combustion chamber, e.g. the cylinder sleeve, the piston, the cylinder head, are subjected. Combustion can shift to detonation in all or part of the chamber's volume both in spark ignition and Diesel cycle (compression ignition) operation. This can be due to the ignition timing or to an incorrect preinjection sequence. It can also be caused by changes in the fuel's characteristics or in environmental conditions such as temperature and humidity. In supercharged internal combustion engines a change in the excess air, caused for example by fouling of the turbocharger or by loss of aftercooling efficiency, can increase the combustion-related stresses to abnormal levels. Likewise, closing of the valves induces stresses that, although not directly harmful, provide information concerning the mechanical state of settings, plays and operating speeds.

Experience has shown that the components surrounding the combustion chamber, and especially the cylinder head, transmit vibrations which provide an indication of pressure changes in the chamber and of the behaviour of the moving parts of the engine (valves, injector needles) which are easier to measure and record and more reliable over time than a direct measurement of the pressure in the chamber. When the pressure swings excite the components, particularly via the resonant frequencies of the combustion chamber, they create mechanical stresses and an increase in the heat exchanges which, although they may not cause immediate damage, can become hazardous over time due to accumulation of the damages.

Drift of the above-mentioned equivalent level over time, for a given load condition, provides an indication of the evolution of key parameters such as spark timing, supercharging air pressure and flowrate, fuel characteristics and so on.

By selectively chopping the signal to isolate particular periods of the engine cycle, it is also possible to focus on the behaviour of a specific component or function, such as the closing of a valve or the injection phase.

It is in fact possible to establish a relation on the one hand between the limit value of an equivalent level of stresses whereupon damages begin to appear on one or more components or functions and on the other hand between the number of equivalent levels counted in one category and certain types of damage, the latter being directly comparable with the fatigue behaviour of the materials. For example, it is possible to correlate a threshold "equivalent level value" with a cavitation erosion event in the part of the cylinder sleeve near the cylinder head, although this same part of the sleeve will actually see thermal cracking only after a sufficient number of occurrences of a given value of equivalent levels.

For a given type of engine, it is necessary to determine the correlation between the value or the number of values of an equivalent level and the occurrence of the event one wishes to monitor, this correlation being saved for all the engines of a same type.

To achieve these results, the inventive procedure provides for the memorization of the value of each equivalent level obtained pursuant to the processing of each of the groups of measurements made. Statistical analysis of the stored values provides useful information about the severity of engine operating conditions. Depending on the results of this analysis, short term decisions can be made concerning immediate modification of certain operating parameters while the engine is in service. In addition, longer term preventive maintenance decisions can be made on the basis of historical data, for example to prevent the fatigue failure of a component.

What is claimed is:

1. A method for monitoring the operation of an internal combustion engine while it is in service, (involving) the method comprising the following steps:

recording the change of pressure occurring in at least one combustion chamber of one or more same-type sample or "control" engines for various values of the operating parameters, said parameters being temporarily modified as required to bring about a plurality of stabilized load conditions ranging from 0 to 100% and to cause vibrations of the amplitude of the pressure swings about the mean value of the pressure ranging from the minimum value of the amplitudes to a maximum value equal to ten times the minimum value, the recording being made over a range of frequencies from 0 to 30,000 Hz and covering one or more successive or nonsuccessive engine cycles;

simultaneously recording at various points of the components surrounding the combustion chamber or chambers of the control engine or engines the amplitude and the frequency of the vibrations generated by overall operation in a frequency range of 0 to 30,000 Hz;

computing the ratio of the spectral power of the pressure signal to the spectral power of each of the signals supplied from each of the measuring points, or the ratio of any values representative of said powers;

determining for which measuring point this ratio differs least from a constant irrespective of load level, said measuring point being assumed to deliver a representative signal;

installing on the service engine a vibration measuring device at the location deduced from the previous steps involving the control engines and using the spectral power level of the signal emitted at various periods during normal-duty operation of the engine, or a value representative of this power, to determine the behavior of the components surrounding the combustion chamber and/or the severity of the stresses to which they are subjected and to take suitable remedial action.

2. An engine monitoring method according to claim 1, wherein the spectral power level of the representative signal is computed at different moments of service engine operation, at regular or irregular intervals and over the timespan of at least one complete cycle.

3. An engine monitoring method according to claim 1, wherein the spectral power level of the representative signal is computed at different moments of the operation of the service engine, at regular or irregular intervals and over one or more engine cycles, and data from only one or some parts of each cycle is saved.

4. An engine monitoring method according to claim 1, wherein the level of a constant and stable signal representing the same spectral power as the representative signal is computed, said level constituting an equivalent level of stresses or of detection of the specific behavior of one or several components surrounding the combustion chamber.

5. An engine monitoring method according to claim 1, wherein the vibratory energy of the signal emitted by the vibration measuring device at different moments of the service engine's operation is taken as the representative value of the spectral power level.

6. An engine monitoring method according to claim 5, wherein, based upon the vibration energy of the signal emitted by the vibration measuring device, the method further comprises computing the equivalent level of a constant, stable signal which represents the same vibration energy as the fluctuating vibrations which actually occurred in the engine.

7. An engine monitoring method according to claim 6, wherein said equivalent level is computed at different moments of service engine operation, at regular or irregular intervals and for one or more engine cycles, and wherein the method further comprises saving only one or some of the equivalent levels computed at different moments.

8. A method according to any one of the previous claims, wherein the measurement periods are determined such as to cover one or more successive or non-successive cycles, each period being contained in a phase of service engine operation when the load varies little or not at all.

9. An engine monitoring method according to claim 8, wherein the values of the previously recorded equivalent levels are classified by level and are stored by level category.

10. An engine monitoring method according to claim 9, wherein the method further comprises comparing the value of the different levels and/or the number of levels reached in the different categories with set point values determined by experiment with the sample engines, the result of this comparison serving as a basis for remedial action.

* * * * *

UNITED STATES PATENT AND TRADEMARK OFFICE
CERTIFICATE OF CORRECTION

PATENT NO.  :  4,761,993
DATED       :  9 August 1988
INVENTOR(S) :  Wojciech KLEPACKI It is certified that error appears in the above-identified patent and that said Letters Patent is hereby corrected as shown below:

Column 4, line 61:  change "vibrations" to --variations--.

Signed and Sealed this

Third Day of January, 1989

Attest:

DONALD J. QUIGG

*Attesting Officer*    *Commissioner of Patents and Trademarks*